United States Patent
Shelby et al.

(10) Patent No.: US 7,587,900 B2
(45) Date of Patent: Sep. 15, 2009

(54) GAS TURBINE ENGINE FUEL CONTROL SYSTEM HAVING A TRANSFER VALVE AND A SHUTOFF VALVE AND A COMMON CONTROLLER THEREFOR

(75) Inventors: Jeffrey Dugan Shelby, South Bend, IN (US); Paul W. Futa, Jr., North Liberty, IN (US); Matthew A. Arend, South Bend, IN (US); Per W. Danzl, Goleta, CA (US)

(73) Assignee: Honeywell International Inc., Morristown, NJ (US)

( * ) Notice: Subject to any disclaimer, the term of this patent is extended or adjusted under 35 U.S.C. 154(b) by 657 days.

(21) Appl. No.: 11/399,421

(22) Filed: Apr. 7, 2006

(65) Prior Publication Data
US 2007/0234732 A1 Oct. 11, 2007

(51) Int. Cl.
*F02C 9/28* (2006.01)
(52) U.S. Cl. .................................. 60/773; 60/39.281
(58) Field of Classification Search ................ 60/39.27, 60/39.281, 734, 772, 773
See application file for complete search history.

(56) References Cited

U.S. PATENT DOCUMENTS

| | | | |
|---|---|---|---|
| 5,088,278 A | 2/1992 | Smith et al. | |
| 5,501,245 A | 3/1996 | Lechevalier | |
| 5,806,300 A | 9/1998 | Veilleux, Jr. et al. | |
| 6,401,446 B1 * | 6/2002 | Gibbons | 60/39.281 |
| 6,412,271 B1 | 7/2002 | Maker et al. | |
| 6,526,743 B2 | 3/2003 | Maker et al. | |
| 6,560,967 B1 | 5/2003 | Cohen et al. | |
| 6,745,556 B2 * | 6/2004 | Elliott | 60/39.281 |
| 7,137,242 B2 * | 11/2006 | Griffiths | 60/39.281 |
| 7,386,981 B2 * | 6/2008 | Zielinski et al. | 60/772 |
| 2003/0056492 A1 | 3/2003 | Henson | |
| 2004/0083711 A1 | 5/2004 | Hodinot et al. | |

* cited by examiner

*Primary Examiner*—Louis J Casaregola
(74) *Attorney, Agent, or Firm*—Ingrassia Fisher & Lorenz, P.C.

(57) ABSTRACT

A fuel control system for a gas turbine engine includes a metering valve for metering a flow of fuel, a throttling valve for maintaining a pressure drop across the metering valve, the throttling valve being shiftable between an open state and a shutoff state blocking an outlet of the metering valve, a primary control pressure supply for supplying a primary control pressure to the metering valve for controlling the position of the metering valve, a backup control pressure supply, a transfer valve shiftable between a first position connecting the primary control pressure to supply to the metering valve and a second position connecting the backup control pressure to the metering valve, and an electrohydraulic servovalve (EHSV) operably connected to the throttling valve and the transfer valve and controlling the state of the transfer valve and the position of the throttling valve. Also a method for controlling a transfer valve and a throttling valve.

14 Claims, 5 Drawing Sheets

GAS TURBINE ENGINE FUEL CONTROL SYSTEM HAVING A TRANSFER VALVE AND A SHUTOFF VALVE AND A COMMON CONTROLLER THEREFOR

FIELD OF THE INVENTION

The present invention is directed toward a fuel control system for a gas turbine engine that includes an integrated controller for controlling the operation of a transfer valve and a shutoff valve, and a method for controlling a fuel control system, and, more specifically, toward a fuel control system for a gas turbine engine in which a single electrohydraulic servovalve (EHSV) controls the positions of a transfer valve and a shutoff valve and a method of using same.

BACKGROUND OF THE INVENTION

A portion of a conventional gas turbine engine fuel control system is illustrated in FIG. 5 and comprises a main fuel passage 200 in which a metering valve 202 is disposed for providing a metered supply of fuel to an engine (not shown). The position of the metering valve 202 is controlled by controlling pressures exerted against a first portion 204 of the metering valve 202 to move the metering valve 202 to a desired position; a linear variable differential transducer (LVDT) 206 may also be associated with the metering valve 202 to provide information to a controller (not shown) regarding the position of the metering valve 202. Control pressure may beneficially be provided from either a primary pressure source 208, 210 or a secondary or backup pressure source 212, 214 to provide redundancy if a problem arises in connection with the primary pressure source 208, 210. A transfer valve 216 controls which pressure source is used to control the position of the metering valve 202. A first EHSV 218 is commonly used to control the position of the transfer valve 216.

A pressure drop across the metering valve 202 is regulated by a throttling valve 220, and a shutoff valve 222 is provided downstream of the metering valve 202 to provide a drip tight shutoff of the fuel flow through the fuel control system. The position of shutoff valve 222 is controlled by a second EHSV 224 which selectively ports a pressure via a passageway 226 against one side of the shutoff valve 222 to move shutoff valve 222 to a closed position. Seals 228 provide for drip-tight shutoff stopping all or substantially all fuel flow through the fuel flow passage downstream of the shutoff valve 202.

Reducing the weight of gas turbine engines and their associated control systems is sometimes a factor in gas turbine engine design, especially when the engine is to be used on an aircraft. It would therefore be desirable to provide a fuel control system for a gas turbine engine that has functionalities and a reliability similar to those of known fuel control systems while reducing the weight of the system.

SUMMARY OF THE INVENTION

These issues and others are addressed by the present invention, a first aspect of which comprises a fuel control system for a gas turbine engine that includes a metering valve for metering a flow of fuel and a throttling valve for maintaining a pressure drop across the metering valve, where the throttling valve is shiftable between an open state and a shutoff state blocking an outlet of the metering valve. The system also includes a primary control pressure supply for supplying a primary control pressure to the metering valve for controlling the position of the metering valve and a backup control pressure supply for supplying a backup control pressure to the metering valve for controlling the position of the metering valve. A transfer valve is shiftable between a first position connecting the primary control pressure supply to the metering valve and a second position connecting the backup control pressure to the metering valve, and an EHSV is operably connected to the throttling valve and the transfer valve for controlling the state of the transfer valve and the position of the throttling valve.

Another aspect of the invention comprises a method that involves providing a metering valve for metering a flow of fuel to a gas turbine engine, a throttling valve for maintaining a pressure drop across the metering valve, a primary control pressure supply, a backup control pressure supply and a transfer valve. An electrohydraulic servovalve (EHSV) is used for controlling the state of the transfer valve and the position of the metering valve by shifting the EHSV to a first position to shift the transfer valve to a transfer valve first position connecting the primary control pressure supply to the metering valve, shifting the EHSV to a second position to shift the transfer valve to a transfer valve second position connecting the backup control pressure supply to the metering valve, and shifting the EHSV to a third position to shift the throttling valve to a position blocking an outlet of the metering valve.

A further aspect of the invention comprises a fuel control system for a gas turbine engine that includes a metering valve for metering a flow of fuel and a throttling valve for maintaining a pressure drop across the metering valve, where the throttling valve is shiftable between an open state and a drip-tight shutoff state blocking an outlet of the metering valve. The system includes a primary control pressure supply, a backup control pressure supply and a latching transfer valve shiftable between a first position and a second position. A first fluid flow pathway connects the primary control pressure supply to the transfer valve and a second fluid flow pathway connects the backup control pressure supply to the transfer valve, and a third fluid flow pathway connecting the transfer valve to the metering valve. The transfer valve is shiftable between a first position connecting the first fluid flow pathway to the third fluid flow pathway and substantially blocking the second fluid flow pathway and a second position connecting the second fluid flow pathway to the third fluid flow pathway and substantially blocking the first fluid flow pathway. An EHSV is operably connected to the throttling valve and the transfer valve for controlling the state of the transfer valve and the position of the throttling valve, the EHSV being shiftable between a first position for shifting the transfer valve to the transfer valve first position, a second position for shifting the transfer valve to the transfer valve second position and a third position for shifting the throttling valve to the shutoff state. A fourth fluid passage extends from a second stage of the EHSV to the throttling valve and the second stage ports a fluid pressure against the throttling valve when the EHSV is in the third position to shift the throttling valve to the shutoff position. At least one spring is provided for biasing the EHSV toward the first position.

BRIEF DESCRIPTION OF THE DRAWINGS

These aspects of the invention and others will be better understood after a reading of the following detailed description of embodiments of the invention together with the following drawings wherein.

DETAILED DESCRIPTION

Figure 1:
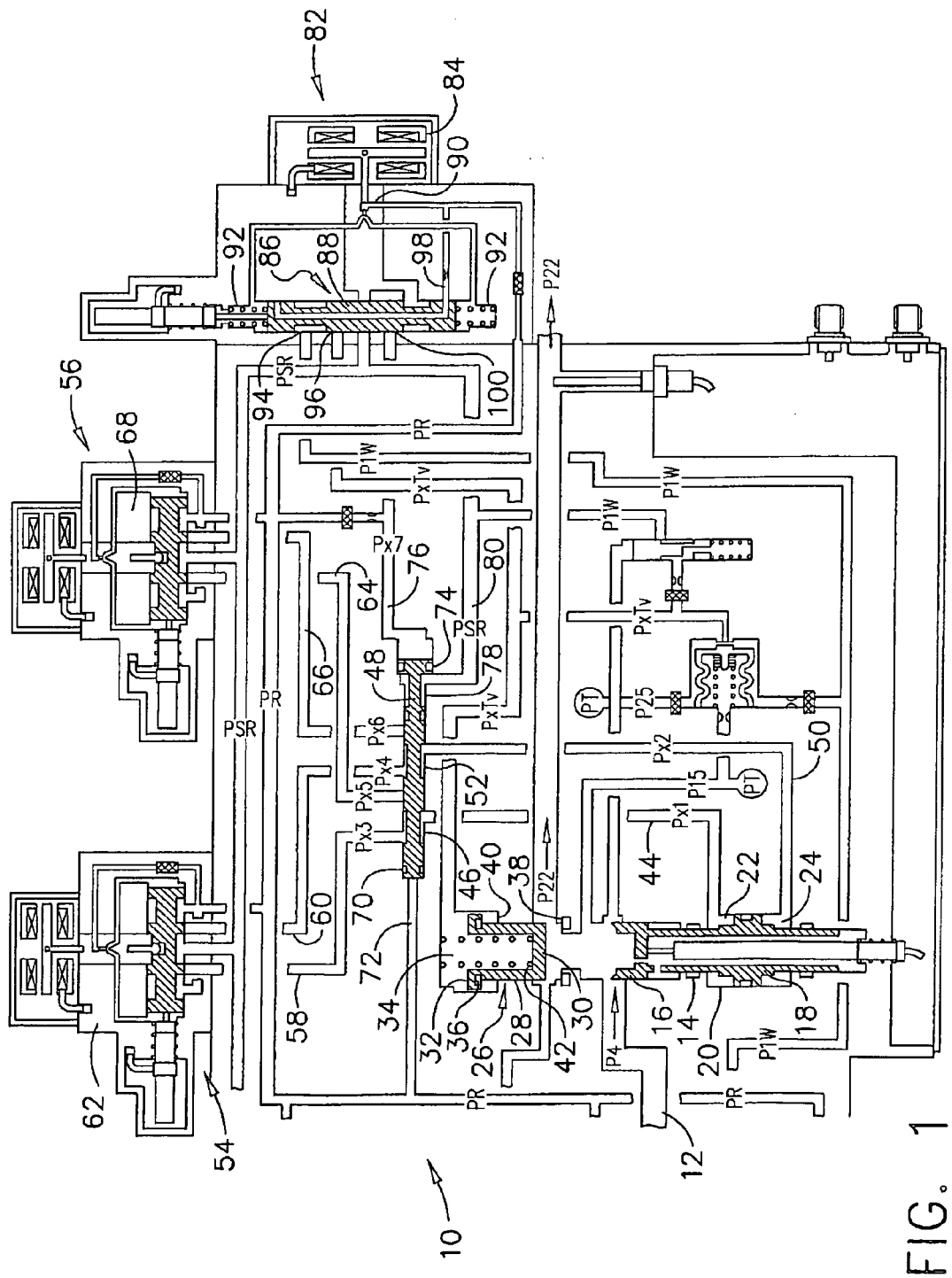
FIG. 1 is a schematic view of a fuel control system according to an embodiment of the present invention showing an EHSV in a first position and a transfer valve in a first transfer valve position.

Referring now to the drawings, wherein the showings are for the purpose of illustrating presently preferred embodiments of the invention only and not for the purpose of limiting same, FIG. 1 illustrates a fuel control system 10 that includes a main fuel line 12 for providing fuel to an engine (not shown) in which a metering valve 14 is provided. Metering valve 14 includes a first portion 16 extending into main fuel line 12 for controlling fuel flow in the fuel line 12 and a second portion 18 located in and sealingly dividing a chamber 20 into a first portion 22 and a second portion 24. The pressure difference between first portion 22 and second portion 24 controls the position of first portion 16 of metering valve 14 in the fuel line 12.

A throttling valve 26 is associated with metering valve 14 for regulating the pressure drop across metering valve 14. Throttling valve 26 includes a valve body 28 having a first portion 30 projecting into the fuel line 12 and a second portion 32 in a chamber 34 which second portion 32 includes a seal 36. Throttling valve 26 further includes a first valve seat 40 against which seal 36 abuts when throttling valve 26 is in a shutoff state and a second valve seat 38 against which first portion 30 abuts when throttling valve 26 is in the shutoff position. In the shutoff position, throttling valve 26 forms a drip-tight seal and prevents or substantially prevents fluid flow therepast. The use of such a throttling valve reduces the need for a separate shutoff valve as used in conventional fuel control systems. A spring 42 connected between chamber 34 and valve body 28 biases valve body 28 toward first and second valve seats 40, 38; however, as discussed hereafter, the position of valve body 28 is more significantly affected by the pressure of fuel in fuel line 12 and the pressure of the fluid in chamber 34.

A first fluid flow passageway 44 connects first portion 22 of chamber 20 to a first portion 46 of a transfer valve 48 and a second fluid flow passageway 50 connects second portion 24 of chamber 20 to a second portion 52 of transfer valve 48. The position of transfer valve 48 determines which of a first source of control pressure 54 and second source of control pressure 56 is used to control the position of metering valve 14. A first conduit 58 and a second conduit 60 connect transfer valve 48 to a first EHSV 62 in the first source of control pressure 54 while a third conduit 64 and a fourth conduit 66 connect transfer valve 48 to the second source of control pressure 56 including a second EHSV 68. When transfer valve 48 is in the position illustrated in FIG. 1, shifted to the left as viewed in that Figure, first conduit 58 is placed in fluid communication with first fluid flow passageway 44 and second conduit 60 is placed in fluid communication with second fluid flow passageway 50 to allow the first EHSV 62 in the first source of control pressure 54 to control the position of the metering valve 14. When transfer valve 48 is in the position illustrated in FIG. 2, to the right as viewed in that Figure, third conduit 64 is placed in fluid communication with first fluid flow passageway 44 and fourth conduit 66 is placed in fluid communication with second fluid flow passageway 50 to allow the second EHSV 68 of second source of control pressure 56 to control the position of the metering valve 14.

Transfer valve 48 includes a first end 70 exposed to fluid pressure PR in a first line 72, a second end 74 exposed to a pressure PX7 in a second line 76 and an annular channel 78 exposed to a pressure PSR in a third line 80, and the position of the transfer valve 48 is determined primarily by the relative pressures at first end 70, second end 74 and in annular channel 78. These pressures, and the pressure in chamber 34 adjacent throttling valve 26, are controlled by a third EHSV 82 as described below.

Third EHSV 82 in this embodiment comprise a two-stage, four-way dual channel EHSV in which the first stage 84 includes a torque motor and the second stage 86 includes a matched spool 88 and sleeve with control pressures established by regulated servo flow through the first stage nozzle 90. Opposing compression springs 92 on either end of spool 88 provide a restoring force to recenter the spool 88 when pressure forces translate the valve in either direction away from a calibrated center. The second stage 86 includes four ports: a washed servo supply port 94 connected to washed servo supply line P1W, a shutoff valve control pressure port 96 connected to chamber 34 by shutoff valve control pressure line PXTV, a regulated servo supply pressure port 98 connected to regulated servo pressure supply line PR, and a regulated servo pressure return port 100 connected to regulated servo pressure return line PSR.

Figure 2:
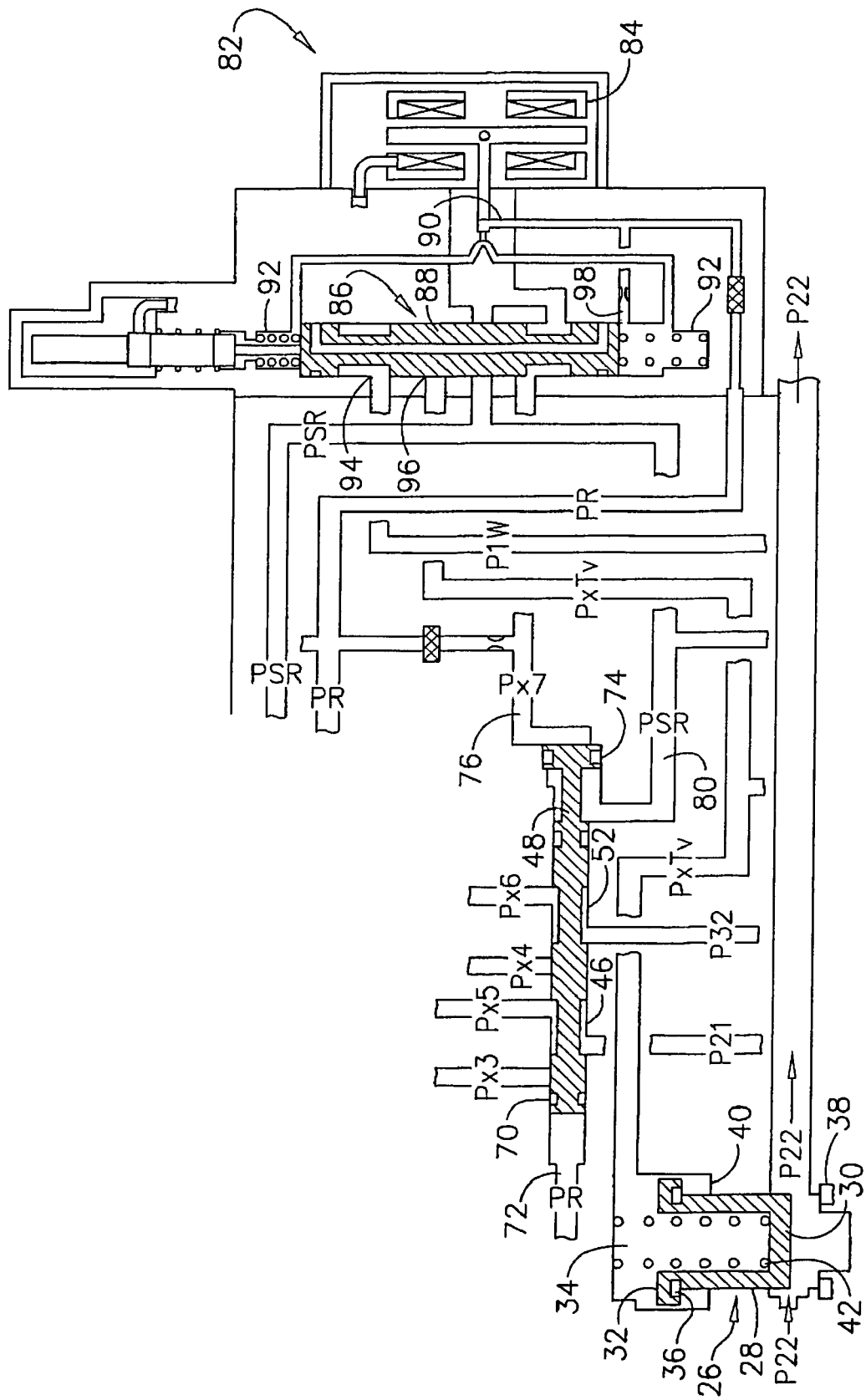
FIG. 2 is schematic view of the fuel control system of FIG. 1 showing the EHSV in a second position and the transfer valve in a second transfer valve position.
Figure 3:
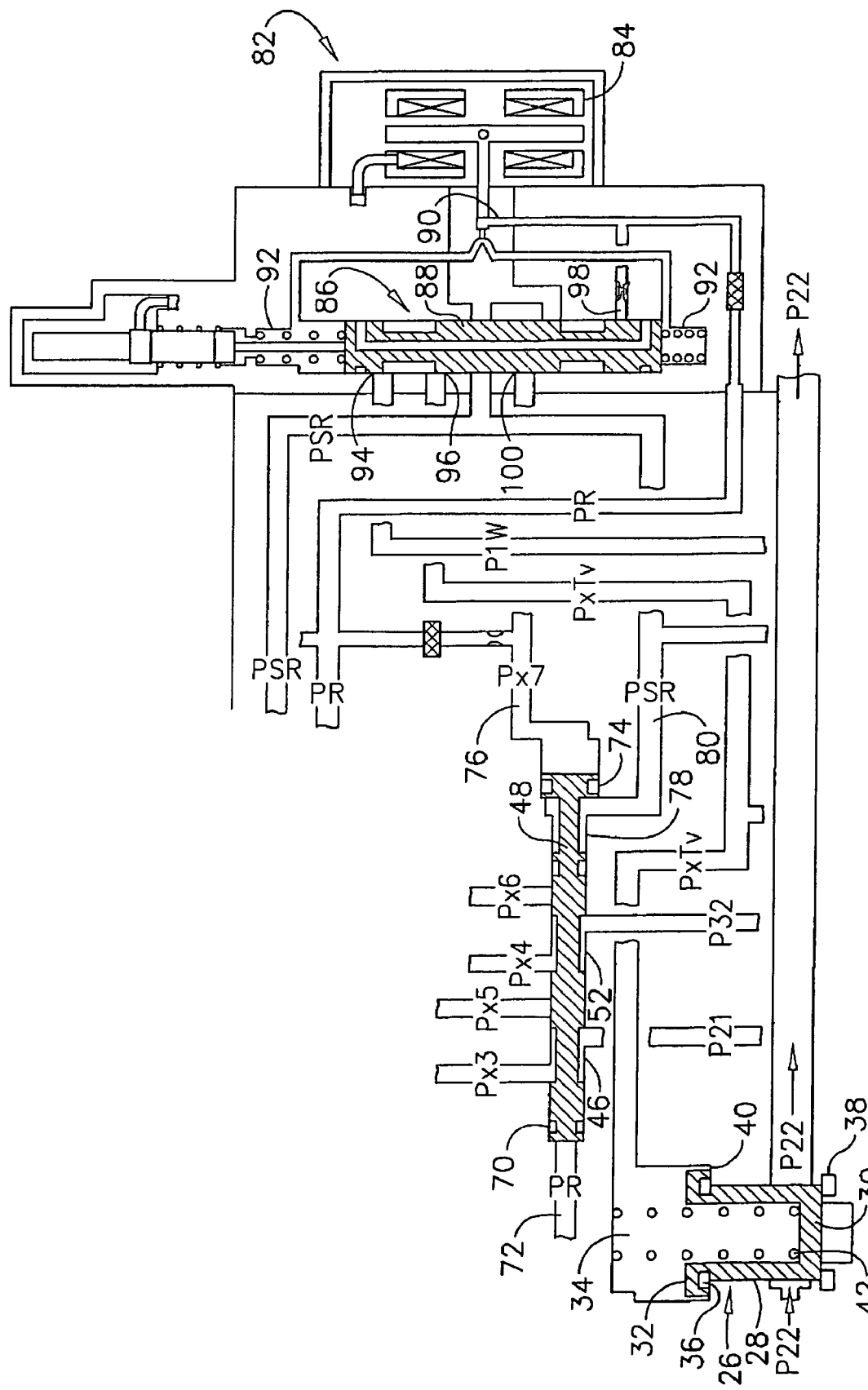
FIG. 3 is schematic view of the fuel control system of FIG. 1 showing the EHSV in a third position, the transfer valve in the first transfer valve position and a throttling valve in a shutoff position.

The operation of third EHSV 82 and first and second EHSV's 62 and 68 is controlled by a controller, such as a full authority digital engine controller (FADEC) (not shown) by controlling the first stage motors of the EHSV's in a well-known manner. Spool 88, when positioned in a first position illustrated in FIG. 1, blocks matched spool control pressure port 100 so that pressure builds in second line 76 and forces transfer valve 48 to the left as illustrated in FIG. 1 thereby connecting first source of control pressure 54 to chamber 20. When EHSV 82 shifts spool 88 to a second position, illustrated in FIG. 2, second line 76 is connected to regulated servo return pressure line PSR thereby allowing the greater pressure in first line 72 to force transfer valve 48 to the right as illustrated in FIG. 2 and connect the second source of control pressure 56 to chamber 20. When EHSV 82 shifts spool 88 to the third position, illustrated in FIG. 3, washed servo pressure supply port 94 is connected to shutoff valve pressure control port 96 to increase pressure in chamber 34 adjacent throttling valve 26 and drive second portion 32 of valve body 28 against first valve seat 40 and first portion 30 of valve body 28 against second valve seat 38 to substantially prevent fuel flow past the throttling valve 26.

In the event of a power failure, with spool 88 in the first position, illustrated in FIG. 1, EHSV 82 will remain in the position illustrated in FIG. 1 due to the biasing forces of compression springs 92. In this position, shutoff pressure control port 96 is blocked by spool 88 which allows throttling valve 26 to shift to the open position. Throttling valve 26 is therefore open in this fail-safe mode while transfer valve 48 is latched and does not change position upon power loss. In the event of a power failure with spool 88 in the third position, illustrated in FIG. 3, compression springs 92 will return spool 88 to the position illustrated in FIG. 1, blocking shutoff pressure control port 96 and allowing the throttling valve 26 to open. If a power loss occurs when spool 88 is in the second position, illustrated in FIG. 2, spool 88 is hydraulically locked in position by opening line 98 and exposing the end of spool 88 to pressure PR. Transfer valve 26 remains latched in position and does not change position upon a power loss. During normal operation, first stage 84 can overcome the pressure supplied by line 98, allowing spool 88 to move to the aforementioned positions.

The above arrangement provides a controller for a latching transfer valve and for a throttling valve which also functions as a shutoff valve and thereby reduces or eliminates the need for a separate shutoff valve and separate shutoff valve controller. In this manner, the weight of a fuel control system can be decreased with a relative minor increase in complexity without sacrificing the functionality or reliability of the fuel control system.

Figure 4:
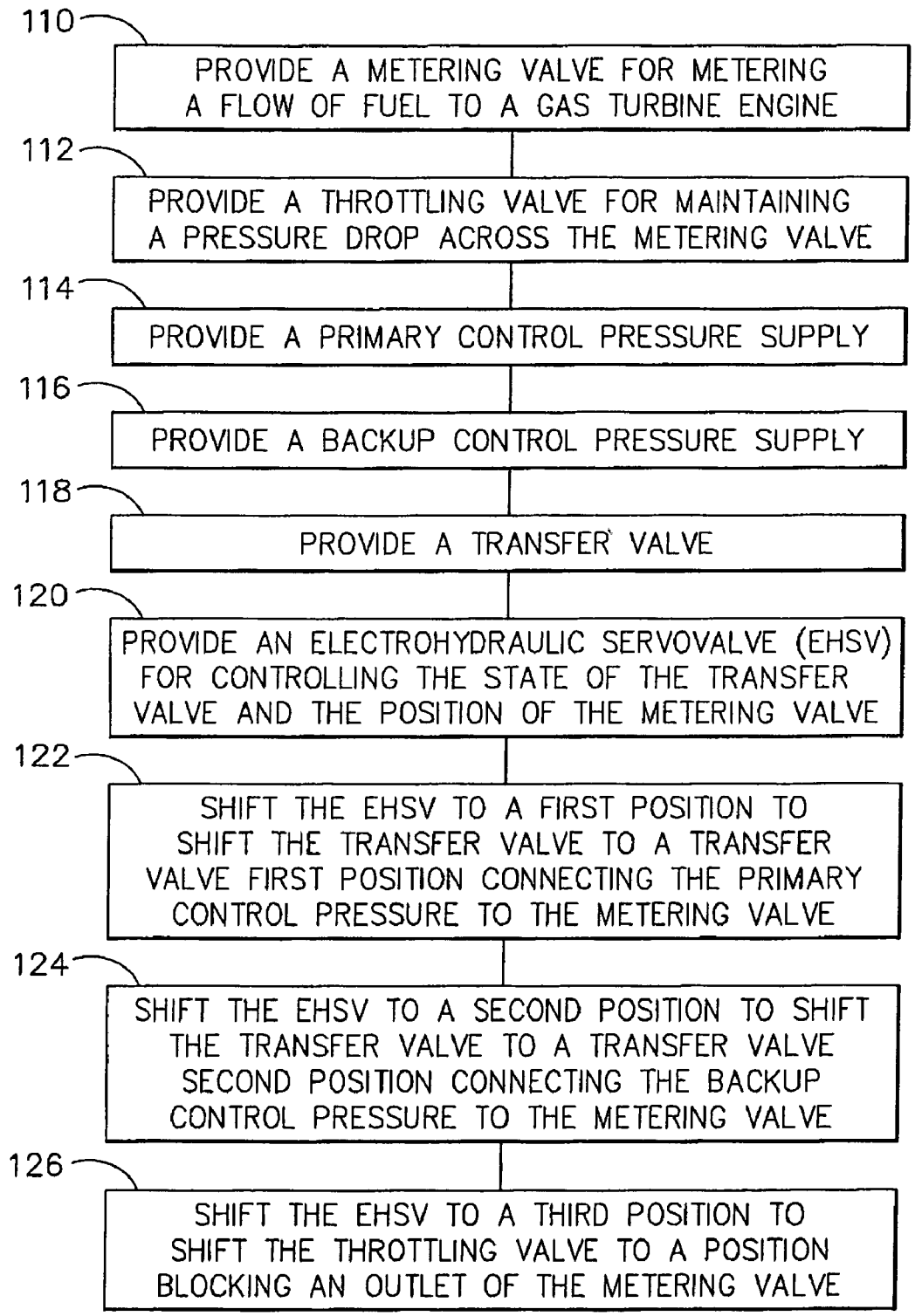
FIG. 4 is a flow chart illustrating a method according to an embodiment of the present invention.
Figure 5:
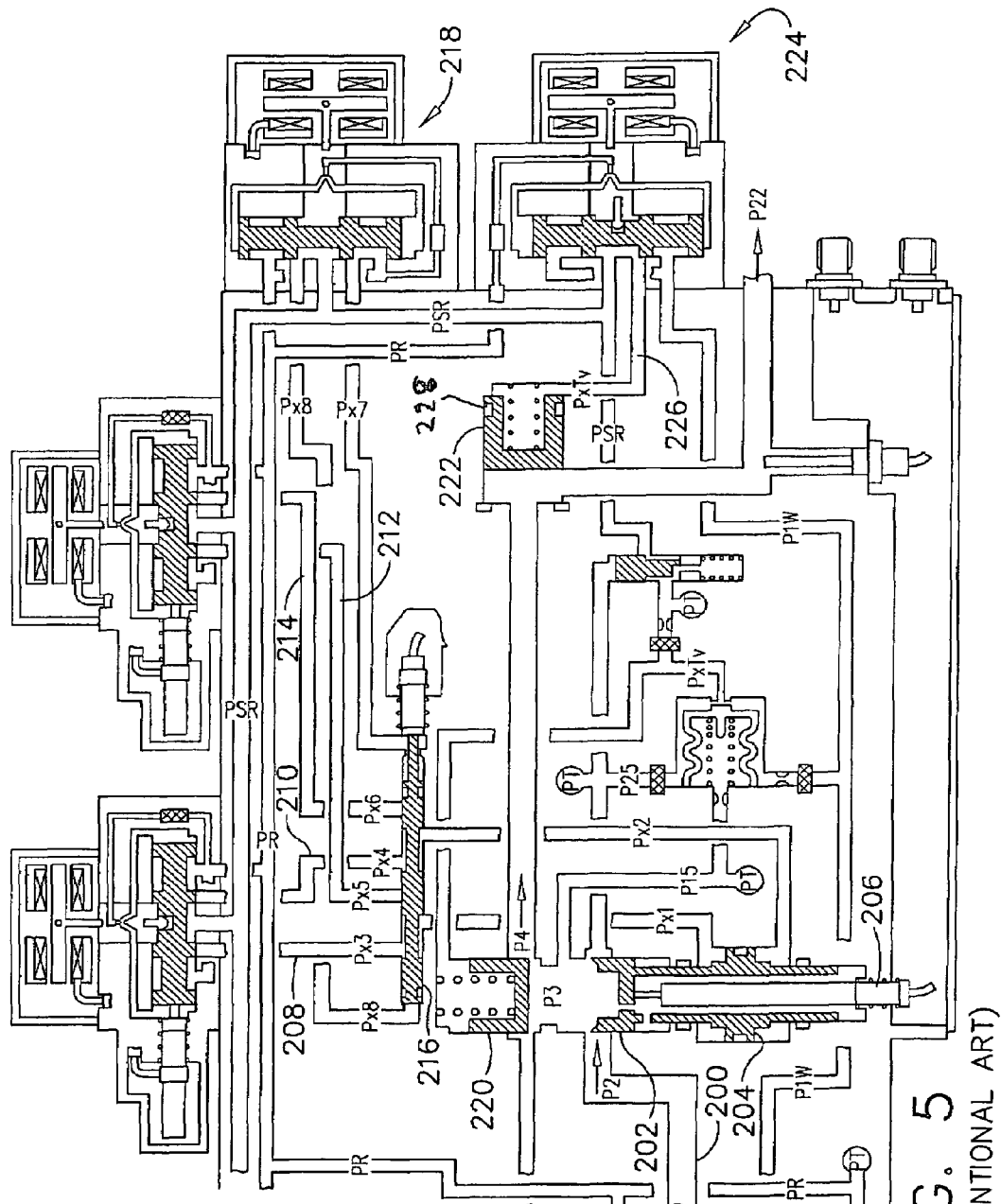
FIG. 5 is a schematic view of a conventional fuel control system.

A method according to an embodiment of the invention is illustrated in FIG. 4 and includes a step 110 of providing a metering valve for metering a flow of fuel to a gas turbine engine, a step 112 of providing a throttling valve for maintaining a pressure drop across the metering valve, a step 114 of providing a primary control pressure supply, a step 116 of providing a backup control pressure supply, a step 118 of providing a transfer valve and a step 120 of provide an EHSV for controlling the state of the transfer valve and the position of the throttling valve. The method further comprises a step 122 of shifting the EHSV to a first position to shift the transfer valve to a transfer valve first position connecting the primary control pressure to the metering valve, a step 124 of shifting shift the EHSV to a second position to shift the transfer valve to a transfer valve second position connecting the backup control pressure to the metering valve, and a step 126 of shifting the EHSV to a third position to shift the throttling valve to a position blocking an outlet of the metering valve.

The present invention has been described herein in terms of a presently preferred embodiment. However, obvious modifications and additions to this embodiment will become apparent to those skilled in the relevant arts upon a reading of the foregoing description. It is intended that all such obvious additions and modifications form a part of the present invention to the extent they fall within the scope of the several claims appended hereto.

We claim:

1. A fuel control system for a gas turbine engine comprising:
    a metering valve for metering a flow of fuel;
    a throttling valve for maintaining a pressure drop across the metering valve, said throttling valve being shiftable between an open state and a shutoff state blocking an outlet of said metering valve;
    a primary control pressure supply for supplying a primary control pressure to said metering valve for controlling the position of said metering valve;
    a backup control pressure supply for supplying a backup control pressure to said metering valve for controlling the position of said metering valve;
    a transfer valve shiftable between a first position connecting said primary control pressure supply to said metering valve and a second position connecting said backup control pressure supply to said metering valve; and
    an electrohydraulic servovalve (EHSV) operably connected to said throttling valve and said transfer valve and controlling the state of said transfer valve and the position of said throttling valve.

2. The fuel control system of claim 1 wherein said EHSV is shiftable between a first position for shifting said transfer valve to said transfer valve first position, a second position for shifting said transfer valve to said transfer valve second position and a third position for shifting said throttling valve to said shutoff state.

3. The fuel control system of claim 2 wherein said metering valve remains in said open state when said EHSV shifts between said first and second positions.

4. The fuel control system of claim 2 wherein said throttling valve comprises a drip-tight shutoff valve.

5. The fuel control system of claim 2 including a fluid passage connecting said EHSV to said throttling valve, said EHSV in said third position porting a pressure through said fluid passage against said throttling valve to shift said throttling valve to said shutoff state.

6. The fuel control system of claim 2 wherein said EHSV is configured to shift out of said third position when power to said EHSV is interrupted.

7. The fuel control system of claim 2 including at least one spring biasing said EHSV toward said first position.

8. The fuel control system of claim 2 including a first fluid flow pathway between said primary control pressure supply and said transfer valve, a second fluid flow pathway between said backup control pressure supply and said transfer valve and a third fluid flow pathway from said transfer valve to said metering valve, wherein said transfer valve substantially blocks said second fluid flow pathway when in said first position.

9. A method comprising the steps of:
    providing a metering valve for metering a flow of fuel to a gas turbine engine;
    providing a throttling valve for maintaining a pressure drop across the metering valve;
    providing a primary control pressure supply;
    providing a backup control pressure supply;
    providing a transfer valve;
    providing an electrohydraulic servovalve (EHSV) for controlling the state of the transfer valve and the position of the metering valve;
    shifting the EHSV to a first position to shift the transfer valve to a transfer valve first position connecting the primary control pressure to the metering valve;
    shifting the EHSV to a second position to shift the transfer valve to a transfer valve second position connecting the backup control pressure to the metering valve; and
    shifting the EHSV to a third position to shift the throttling valve to a position blocking an outlet of the metering valve.

10. The method of claim 9 wherein said step of shifting the EHSV to a third position does not change the position of the transfer valve.

11. The method of claim 9 wherein said step of shifting the throttling valve to a position blocking an outlet of the metering valve comprises the step of sealing the outlet of the metering valve in a drip-tight manner.

12. A fuel control system for a gas turbine engine comprising:
    a metering valve for metering a flow of fuel;
    a throttling valve for maintaining a pressure drop across the metering valve, said throttling valve being shiftable between an open state and a drip-tight shutoff state blocking an outlet of said metering valve;
    a primary control pressure supply;
    a backup control pressure supply;
    a latching transfer valve shiftable between a first position and a second position;
    a first fluid flow pathway connecting said primary control pressure supply to said transfer valve;
    a second fluid flow pathway connecting said backup control pressure supply to said transfer valve;
    a third fluid flow pathway connecting said transfer valve to said metering valve;

said transfer valve being shiftable between a first position connecting said first fluid flow pathway to said third fluid flow pathway and substantially blocking said second fluid flow pathway and a second position connecting said second fluid flow pathway to said third fluid flow pathway and substantially blocking said first fluid flow pathway;

an electrohydraulic servovalve (EHSV) comprising a spool slidably mounted in a sleeve and operably connected to said throttling valve and said transfer valve for controlling the state of said transfer valve and the position of said throttling valve, said spool being shiftable between a first position for shifting said transfer valve to said transfer valve first position, a second position for shifting said transfer valve to said transfer valve second position and a third position for shifting said throttling valve to said shutoff state; and a fourth fluid passage from the sleeve to said throttling valve for porting a fluid pressure against said throttling valve when said EHSV is in said third position; and at least one spring biasing said spool toward said first position.

13. The fuel control system of claim 12 including a fifth fluid passage from said sleeve, said fifth fluid passage being selectively blocked by said spool, and unblocked by said spool when said spool is in said second position, pressure from said fifth fluid passage hydraulically locking said spool in said second position if a power loss occurs when said spool is in said second position.

14. The fuel control system of claim 12 wherein said EHSV includes a first stage adapted to shift said spool from a hydraulically locked position.

* * * * *

UNITED STATES PATENT AND TRADEMARK OFFICE
CERTIFICATE OF CORRECTION

PATENT NO. : 7,587,900 B2 Page 1 of 1
APPLICATION NO. : 11/399421
DATED : September 15, 2009
INVENTOR(S) : Shelby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Twenty-first Day of September, 2010

David J. Kappos
*Director of the United States Patent and Trademark Office*